Jan. 1, 1957 G. CREMER ET AL 2,775,823
METHOD OF OPERATION OF TUNNEL KILNS COMBINED WITH DRYING CHAMBERS
Filed May 20, 1953
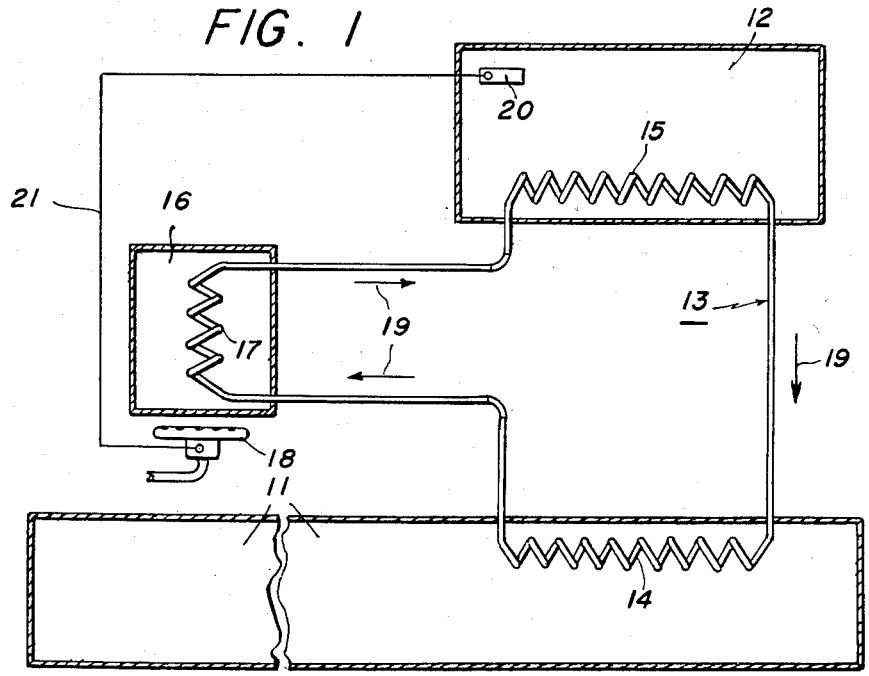
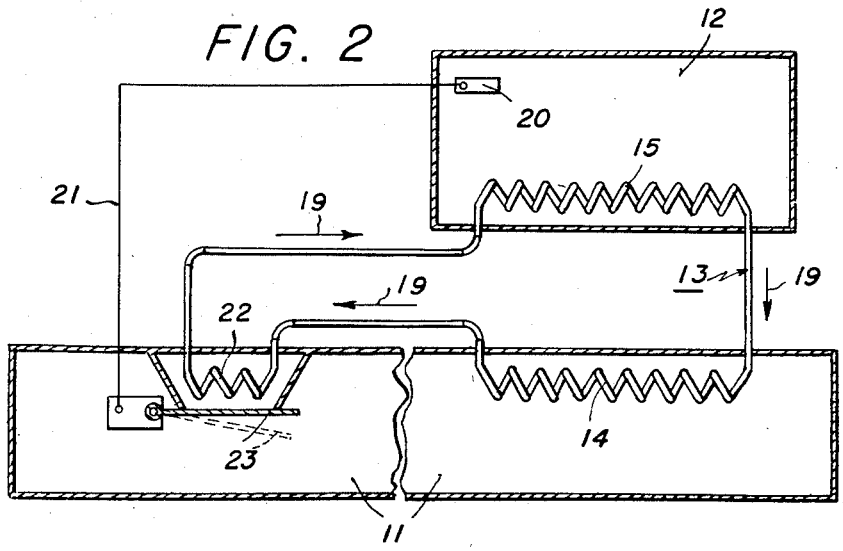
INVENTORS
GOTTFRIED CREMER
& HEINZ BEHRENS
BY Malcolm W. Fraser
PATENT ATTORNEY

United States Patent Office

2,775,823
Patented Jan. 1, 1957

2,775,823

METHOD OF OPERATION OF TUNNEL KILNS COMBINED WITH DRYING CHAMBERS

Gottfried Cremer, Koln-Junkersdorf, and Heinz Behrens, Schwarzenfeld, Oberpfalz, Germany Application May 20, 1953, Serial No. 360,835

Claims priority, application Germany May 21, 1952

3 Claims. (Cl. 34—35)

The invention relates to a method of operation of tunnel kilns combined with drying chambers. It relates more especially to plants with tunnel kilns, in which the cooling of the fired wares is carried out by pipe lines or pipe registers, which are disposed in the cooling zone and through which water flows and the heated water is used for the heating of drying chambers for wares to be fired later.

Tunnel kilns operated in this manner are distinguished from tunnel kilns operating in the conventional way (that is cooled by air which flows through flues in the roof and in the side walls of the kiln) by considerably less fuel consumption, because it is possible to control completely the temperature conditions in the kiln flue.

The result of the good thermal efficiency of such kilns is that the amount of waste heat available for the operation of drying plants combined therewith is considerably less than in the conventional air-cooled tunnel kilns operating with less favourable utilisation of heat. The amount of waste heat is not sufficient for the operation of the associated drying plant, especially when it is a matter of drying shaped ceramic articles, which have a comparatively large content of water as a result of the method of shaping used; this not only applies to articles produced for example by the moulding method but also to other shaped articles for the production of which a high degree of plasticity is necessary.

The relatively large amounts of heat necessary for the drying of such products makes the best possible utilization of the waste heat necessary in tunnel kilns operating with good thermal efficiency and thus producing relatively small amounts of waste heat.

A substantially more favorable basis for this is given in the case of kilns, in which pipe lines or pipe registers, through which water flows, are used for the cooling (i. e. kiln using a liquid cooling medium) than when air generally introduced directly is used for the cooling, since air can only be supplied to the drying chambers in pipes of very large cross-section and with considerable losses even in the case of good insulation. Since air leaving the drying chambers and flowing off into the open air has still an appreciable heat content, further amounts of heat are lost with it, whereas when the waste heat is recovered in the form of hot water, the heat content of the water can be utilized until the temperature is balanced with that of drying chamber, because the pipe lines are constructed in any desired length, preferably as ribbed pipes, and can be conducted through the drying chambers. Heat losses therefore cannot occur at all, because the water at this temperature can be and preferably is conducted back again into the cooling system of the tunnel kiln.

Indirect heating in this manner (that is in a substantially calm atmosphere, moved simply by the natural updrive of the moisture loaded air which is being heated) is of great advantage, especially for drying sensitive goods.

The difficulties, which arise from the combination of a tunnel kiln operated in the described manner with such a drying system, are based on the necessity of always supplying to the drying system the amount of heat (in the form of heated water) which is necessary at every stage of the drying process.

The amount of heat given off from tunnel kilns varies, for example, in dependence on the duration of feed, on corrections, made as occasion arises, for the regulation of the cooling pipes for the purpose of maintaining the systematic cooling curve, on the necessity, occurring on some occasions, of branching off part of the heat from the cooling system for the purpose of the tunnel kiln itself (preheating zone, operation of the burners, etc.) and for other reasons.

The purpose of the invention is to avoid these difficulties, and to make it possible to supply always the amount of heat to the drying system combined with the tunnel kiln—independently of changes in the amount of waste heat supplied by the tunnel kiln—which is necessary to keep fluctuations completely away from the drying chambers.

This is attained according to the invention in that the water, after passing through the pipe line or pipe register is used for the heating of a drying chamber and which is adjusted according to this amount of heat given off.

According to a further feature of the invention the amount of heat given off to the drying chamber is regulated by means of an additional heating boiler connected in the pipe leading to the drying chamber. Such an additional heating boiler supplies that extra water, which is necessary at the time for providing the amount of heat needed for the operation of the drying system. The whole plant must therefore be so constructed that the amount of heat provided by the tunnel kiln for the drying chamber in the most favorable case is somewhat lower than the smallest amount necessary for the drying system.

According to a further feature of the invention, the additional heating boiler is provided with a regulating member which, controlled from control points disposed in the drying system, automatically adjusts the heating of the boiler (which is preferably by the same fuel, such as gas or electricity, as that of the tunnel kiln) so that it always produces the needed additional heat.

A further, especially advantageous form of application of the method according to the invention makes it possible to do without an additional heating boiler.

According to this form of application of the invention the additional amount of heat for the drying chamber (which varies in quantity according to the operating conditions of the tunnel kiln) is supplied through pipe lines or pipe registers (not in themselves serving for cooling) disposed in the firing zone of the tunnel kiln, at its end or in its immediate neighbourhood, and provided in the kiln flue, which pipe lines or pipe registers are screened especially by ceramic dampers.

The adjustment of the amount of heat given off from the cool zone for the replenishing to the amount necessary for the operation of the drying system is done in this case by a regulating device, which is preferably automatically controlled in response to the temperature conditions in the dry chamber or chambers and which suitably adjusts the dampers covering the pipe lines disposed at the said points of the firing zone.

According to a further feature of the invention the necessary amount of heat to make up the difference can be supplied from the preheating zone through regulatable, screenable pipe lines or pipe registers disposed in it and through which water flows and which are at the same time used for regulating the temperature conditions in the preheating zone in the vertical as well as in the horizontal direction of the kiln flue in desired way.

The construction of the drying system in detail can be of any kind. It can consist of one single chamber or of several chambers connected one behind the other, or if necessary may be constructed as a drying channel.

It is of no importance for the invention whether the heating water (which, after it has given off its heat to the material to be dried is again supplied to the pipes at the cooling end of the tunnel kiln) circulates under convection currents or whether circulating pumps are used. Similarly the absolute degrees of temperature are of no importance for the principle of the invention. These are adjusted according to the existing requirements.

Particular advantages result for the course of the drying process, as already observed, when it is carried out in practically tranquil atmosphere.

A special advantage of the method moreover lies also in the possibility of controlling the temperature, with which water again passes into the cooling pipes of the tunnel kiln after its return from the drying system, and also in the uniformity of the whole operations achieved thereby.

The arrangement of the pipe lines, through which cooling medium flows, in the preheating zone proposed according to the invention opens in addition completely new possibilities, for example for the firing of masses mixed with fritting substances which are self-firing to a certain extent, because by the local cooling systematically provided in the region of the preheating zone the course of the burning process of such masses can be excellently controlled.

For these reasons the last measure is also applicable independent of the combination of the tunnel kiln with a drying system and is in itself a feature of the invention.

Examples of combinations of tunnel kilns and drying chambers, in which the methods according to the present invention can be carried out, are illustrated in the drawing appended hereto, in which Figure 1 shows schematically a first embodiment of this combination with the necessary heat exchange system;

Figure 2 illustrates schematically a second and a third embodiment together with the heat exchange systems.

In Figure 1, a tunnel kiln 11 and a drying chamber 12 are separately provided and brought in heat exchanging relationship by interconnecting them by means of a fluid- or water-filled pipe system 13 being equipped with ribs or forming coils 14 and 15 in the kiln 11 and in the drying chamber 12, respectively, whereby the drying chamber 12 is heated by the fluid or water in the coil 15, said fluid or water being heated when passing through the coil 14 in the kiln 11.

A boiler 16 serves to supply additional heat to the coil 15, as a coil 17 in this boiler 16 is connected between the coils 14 and 15 and thus forms part of the closed pipe system 13. A heat source, such as an electric heater or a burner 18, additionally heats the fluid or water in the coil 17 and, thereby, adds heat to the fluid or water circulating through the pipe system 13 in the direction of the arrows 19. The amount of heat added to the system in the boiler 16 is automatically and accurately controlled by means of a thermostat 20 connected to the heat source or burner 18 via an electric circuit 21 in accordance with and in response to the desired operative conditions of the drying chamber 12. As the pipe system 13 is closed, the heat exchanging fluid or water is continously recirculated through all parts of this system, so that the fluid or water, after giving up its heat to the drying chamber 12, is continuously reheated when flowing through the coils 14 and 17 in the kiln and boiler.

In the embodiment illustrated in Figure 2, the additional heat is taken either from the firing or from the heating zone of the kiln, rather than from a boiler, as in the embodiment of Figure 1, by providing a heat exchange coil 22 in a part of the kiln 11, which may be either its firing or its preheating zone. This coil 22 is connected between the coil 14 in the cooling zone of the kiln 11 and the coil 15 in the drying chamber in the same way as coil 17 in Figure 1. In order to control the amount of heat transferred to the coil 22 in the firing or in the preheating zone, this coil is shielded by and behind a heat-resistant and insulating or ceramic damper 23 which can be opened and closed under control of the thermostat 20 in the kiln 12 via the electric circuit 21. This thermostat 20 controls the damper in principally the same way as the burner 18 is controlled in Figure 1.

We claim:

1. The method of operating a tunnel kiln at a relatively high temperature and drying chamber at a lower temperature, comprising circulating water through pipes in said kiln to heat said water by heat exchange with the atmosphere in said kiln, controlling the heat exchange to said water in accordance with the operative conditions required in said kiln, circulating said heated water through pipes in said drying chamber to heat the atmosphere in said chamber, recirculating said water from said drying chamber to said kiln for reheating, supplying additional heat to said water between said kiln and said drying chamber in accordance with the desired operative conditions of said drying chamber and automatically regulating the supply of additional heat in response to the temperature conditions in said drying chamber.

2. The method of operating a tunnel kiln at a relatively high temperature and a drying chamber at a lower temperature, comprising circulating water through pipes in the cooling zone of said kiln to heat said water by heat exchange with the atmosphere in said kiln, controlling the heat exchange to said water in accordance with the operative conditions required in said kiln, circulating said heated water through pipes in said drying chamber to heat the atmosphere in said chamber, recirculating said water from said drying chamber to said kiln for reheating, supplying additional heat to said drying chamber by circulating water through pipes in heat exchange with the firing zone of said kiln and circulating said latter water also through pipes in said drying chamber, and regulating in response to the temperature in said drying chamber the amount of heat transferred to said latter water by the heat exchange with said firing zone.

3. The method of operating a tunnel kiln at a relatively high temperature and a drying chamber at a lower temperature, comprising circulating water through pipes in the cooling zone of said kiln to heat said water by heat exchange with the atmosphere in said kiln, controlling the heat exchange to said water in accordance with the operative conditions desired in said kiln, circulating said heated water through pipes in said drying chamber to heat the atmosphere in said chamber, recirculating said water from said drying chamber to said kiln for reheating, supplying additional heat to said drying chamber by circulating water through pipes in heat exchange with the preheating zone of said kiln and circulating said latter water also through pipes in said drying chamber, and regulating in response to the temperature in said drying chamber the amount of heat transferred to said latter water by the heat exchange with said preheating zone.

References Cited in the file of this patent

UNITED STATES PATENTS

| 1,369,285 | Kupfer | Feb. 22, 1921 |
| 2,329,581 | Bernstein | Sept. 14, 1943 |
| 2,622,342 | Goulounes et al. | Dec. 23, 1952 |

FOREIGN PATENTS

| 77,522 | Norway | Nov. 27, 1947 |
| 407,367 | Italy | Oct. 3, 1944 |